UNITED STATES PATENT OFFICE.

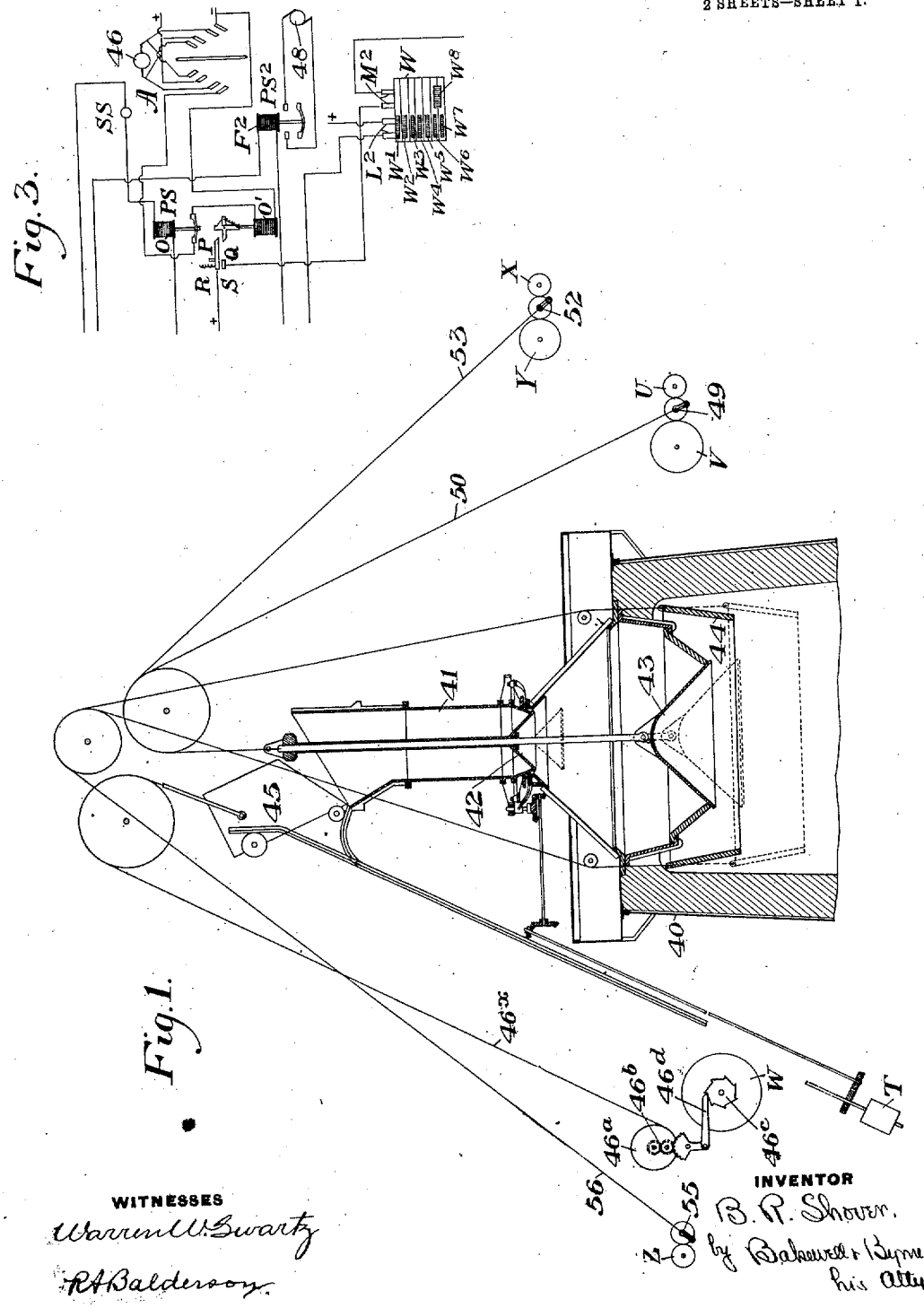

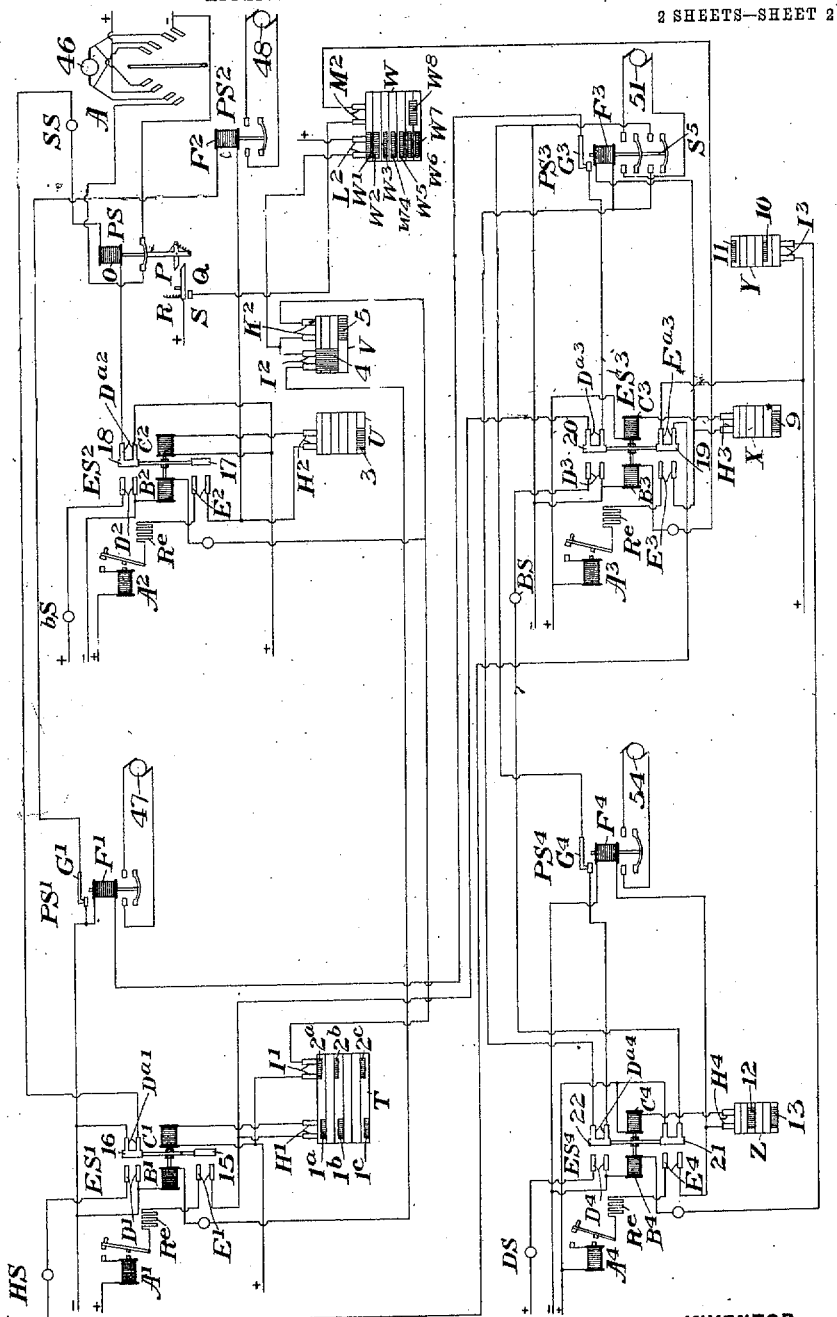

BARTON R. SHOVER, OF YOUNGSTOWN, OHIO.

MEANS FOR CONTROLLING THE OPERATIONS OF BLAST-FURNACE-CHARGING DEVICES.

No. 868,712.     Specification of Letters Patent.     Patented Oct. 22, 1907.

Application filed July 17, 1906. Serial No. 326,573.

*To all whom it may concern:*

Be it known that I, BARTON R. SHOVER, of Youngstown, Mahoning county, Ohio, have invented a new and useful Means for Controlling the Operations of Blast-Furnace-Charging Devices, of which the following is a full, clear, and exact description, reference being had to the accompanying drawings, forming part of this specification, in which—

Figure 1 is a diagrammatic view showing the movable parts of the furnace whose operations are controlled, and also the contact devices actuated thereby; and Fig. 2 is a wiring diagram showing the electrical circuits and connections, the various contact drums being shown in development. Fig. 3 is a partial diagram showing a modification.

This invention is an improvement upon the means described and broadly claimed in my pending application Serial No. 295,685, filed January 12, 1906.

In the operation of blast furnaces, it is essential to the proper working of the furnace that a certain predetermined cycle of charging operations shall be performed, each step of the cycle being done at the proper time, and only when all the predetermined steps have been completed.

The object of this invention is to provide effective and practical means whereby the operations of the various movable parts of a furnace charging device, or of any two or more of such movable parts, may be so automatically controlled that the operator is of necessity compelled to operate them in a predetermined order or cycle.

To this end, my invention consists in the provision of means whereby the motive devices which actuate the moving parts of the charging devices are each rendered inoperative except at the times when the operations precedent to each have been properly performed, the operations as a whole being initially controlled by and dependent upon the movement of the skip or hoist.

My invention also consists in the novel means whereby the operations of the charging parts at the top of the furnace are controlled by the skip or hoist.

In the drawings, I have shown my invention as applied to the control of a skip hoist, a revolving hopper, an upper bell (or gas seal), a main bell, and a vertically movable distributer, in such a manner that the operation of each is made dependent upon the proper relative operations of the others; but it will be readily understood that the invention is equally applicable to the control of any two or more of these parts. I have also illustrated the proper circuit closing devices and connections for a certain predetermined cycle of operations hereinafter described, but by changing the ratios of the gears, or other connecting devices, by which the movable contact carriers or drums are actuated, or by changing the number or position of the movable contacts, or both, the cycles of operation and the steps going to make up the same, may be changed to suit the work of any particular furnace or to vary the method of charging any one furnace as may be desired.

In carrying out my invention, the movable charging devices are each provided with a separate driving mechanism. I have shown, and prefer to employ separate electric motors for this purpose, but motors or cylinders actuated by steam, compressed air, or hydraulic power, may be used, or two or more of the devices may be driven from the same shaft by means of magnetic or friction clutches.

In connection with each motor I provide, in the arrangement shown, switch mechanism for opening and closing each circuit, the operation of this switch mechanism being controlled by circuit making and breaking devices, actuated by the movable parts of the furnace charging apparatus, each such switch mechanism being controlled by the movement of one or more of the other furnace charging parts, and the circuits being so interconnected and interdependent that the circuit of any particular motor cannot be closed except upon the completion of the precedent operations. I also preferably provide in the motor circuits pilot or safety switches by which the motor circuits are ultimately closed, and which are further arranged to actuate circuit-making and breaking devices interposed in the several controlling circuits, these devices acting to positively prevent the premature operation of any motor by reason of temporary circuit conditions which might otherwise be established. When steam, compressed air, or hydraulic motors, or cylinders, are employed, in lieu of these pilot switches, the actuating levers or controlling handles of the motors may be locked and released electro-magnetically, and the same results secured. And when the charging parts are driven through clutch mechanism, the clutch mechanism may be similarly controlled.

My invention also consists in the novel construction, arrangement and combination of the parts all substantially as hereinafter described and pointed out in the appended claims.

In the drawings, 40 designates the furnace top, 41 the rotary hopper, 42 the upper or small bell, 43 the lower or main bell, 44 the vertically movable distributer, and 45 the skip car. 46 is the motor for actuating the skip, through the drum 46$^a$ and cable 46$^\times$, 47 the motor for revolving the hopper 41, 48 the motor which actuates the upper bell through the crank shaft 49 and the cable 50. 51 is the motor which operates the lower bell through the crank shaft 52 and cable 53. 54 is the motor which actuates the distributer 44 through the crank shaft 55 and the cable 56. These are the usual parts of a blast furnace of this type.

A, A', A², A³ and A⁴, are the respective hand switches or controllers which are closed by the operator for operating the skip hoist, the revolving hopper, the upper bell, the main bell, and the distributer.

ES', ES², ES³ and ES⁴ are electro-magnetic controlling switches through which the circuits of the controllers A', A², A³ and A⁴ are respectively made. These four controlling switches, as shown, are all of substantially similar construction, and consist each of three or four sets of fixed contacts, a movable switch member carrying coöperating contacts, and two oppositely arranged solenoids for moving the movable member from one position to the other.

In the switch ES', B' and C' designate the two solenoids; E', D' and D^a', the three sets of fixed contacts, and 15 and 16 the two movable contacts carried by the movable member of the switch, the contacts D' and D^a' being located oppositely to each other and bridged by the contacts 16 in the respective positions of the movable switch member, and the contacts E' arranged to be bridged by the movable contact 15 in one position of such member. The contacts D', together with the contacts 16, control in part the hopper signal HS, which is preferably an electric lamp, although it may be any suitable electrically operated signal. The two contacts E', together with the contact 15, complete the circuit to the controller A', and the two contacts D^a' with the contact 16, control in part the circuit of the coil O of the pilot switch PS for the skip motor 46.

In the switch ES² the fixed contacts D² with the movable contact 18 control the upper bell signal bS; the fixed contacts E² with the movable contact 17 complete the circuit of the controller A², and the two contacts D^a² with the movable contact 18 control in part the circuit of the solenoid coil O of the pilot switch PS of the skip motor, being in series with the contacts D^a' of the switch ES'. B² and C² are the solenoids which actuate the movable member of this switch.

In the switch ES³ the fixed contacts D³ and the movable contact 20 control in part the circuit of the main bell signal BS. The fixed contacts E³ and the movable contact 19 complete the circuit of the main bell controller A³, and the fixed contacts D^a³ and movable contact 20 have the functions hereinafter described. This switch has also an extra pair of fixed contacts E^a³, which, when bridged by the contact 19, complete circuits hereinafter described. B³ and C³ are the actuating solenoids for this switch.

In the switch ES⁴, the fixed contacts D⁴ with the movable contact 22 control the distributer signal DS. The fixed contact E⁴ and the movable contact 21 complete the circuit of the distributer controller A⁴, and the fixed contacts D^a⁴ with the movable contact 22 control in part the circuit of the magnet coil F³ of the pilot switch PS³ of the main bell motor. B⁴ and C⁴ are the actuating solenoids for this switch.

Each of the four switches ES', ES², ES³ and ES⁴ has a resistance R⁰ in series with its controller, the purpose of which will hereinafter appear.

Each of the four pilot switches PS', PS², PS³ and PS⁴ has its coil in series with the corresponding controller, the coil of switch PS' being also in series with the contacts D^a³ of the controller ES³. The coil O of the skip motor pilot switch PS has its coil in series with the contacts D^a' and D^a² of the switches ES' and ES², so that the circuit of such coil cannot be closed except when both these switches are in proper position.

T is a contact drum geared to or otherwise actuated by the revolving hopper 41, in such a manner as to make two revolutions to every three revolutions of the hopper. Carried on this drum are three contacts, 1^a, 1^b and 1^c, contacts 1^a and 1^b being spaced 120 degrees apart from center to center, contacts 1^b and 1^c, 180 degrees apart, and 1^c and 1^a, 60 degrees apart. These contacts are arranged to bridge relatively fixed contact fingers H', one of which is connected to the solenoid coil C' of the switch ES', and through such coil to one side of the supply circuit, and the other of which is connected through the switch ES³ with the magnet coil F' of the pilot switch PS' and thence to the other side of the circuit. The drum T also has three other contacts 2^a, 2^b, 2^c, which are spaced similarly to the contacts 1^a, 1^b and 1^c, but which are shown as narrower and are not engaged by their contact fingers I' until after the corresponding engagements of the fingers H'. One finger I' is connected to one side of the supply circuit, and the other finger is connected to the coil B² of the switch ES² and to a contact finger K² of another contact drum V hereinafter described.

U is a contact drum, which is geared directly to, or otherwise actuated by, the main shaft of the upper bell-actuating motor 48, so as to make one complete revolution each time the bell opens and closes. This drum carries a single contact 3 arranged, in one position of the drum, to bridge a pair of contact fingers H², one of which is connected to one side of the supply circuit through the solenoid coil C² of the switch ES², and the other of which is connected in series with the coil F² of the pilot switch PS² of the small bell motor 48.

V is a third drum which is geared to, and actuated by the main shaft of the upper bell actuating motor 48, so as to make one revolution for each four complete operations of the bell. This drum carries a contact 4, which bridges contact fingers I² during three-fourths of the revolution of the drum, and also a second contact 5 which is arranged to bridge a second pair of contact fingers K² during the remaining one-fourth revolution, the arrangement being such that one of these two contacts, but not both of them, is always bridging one pair of the fingers. One of the fingers I² is connected to one side of the line through the solenoid coil B' of the switch ES', and the other finger I² is connected to the other side of the line through a switch W, hereinafter described. One of the fingers K² is connected in multiple with the second described finger I², and the other one is connected with one of the fingers I² of the drum T, as before described, and also with the coil B² of the switch ES², whereby when the fingers K² are bridged by the contact 5, the circuit of the coil B² may be completed independently of the hopper-controlled drum T.

W is a drum which is operated by the skip movement 46^a through gear 46^b, ratchet 46^c, and pawl 46^d, or in any other suitable manner, so as to make one-seventh of a revolution to each complete movement of the skip. This drum carries seven contacts, W', W², W³, W⁴, W⁵, W⁶ and W⁷, each of which is arranged to bridge a pair of contact fingers L². One of the fingers L² is connected directly to one side of the line, and the other is connected to the multiply connected fingers I² and K² of the drum V. The drum W also has another contact W⁸, which is arranged to bridge two contact fingers M², when the skip starts down after delivering each seventh load to the hopper. One of these fingers M² is connected through the contacts of a make-and-break switch SR with one side of the line, and the other of said fingers is connected to the other side of the line through the coil B³ of the controller switch ES³. The make-and-break switch SR consists of a movable lever arm Q carrying the contact R, and arranged to be engaged and moved to close the circuit at SR by an arm P on an extension of the movable core of the pilot switch PS, so that contact will be momentarily made at QR each time the coil O is energized. This circuit is not, however, effective except at such times as the fingers M² are bridged by the contact W⁸. As the coil B³ of the controller ES³ is connected in this circuit, as above described, it follows that the large bell motor circuit cannot be closed to operate the large bell, except after the skip has discharged the required number (in the present instance, seven), of times.

X is a contact drum, which is geared directly to the main actuating shaft for the main bell, or which is otherwise actuated by the main bell, to make one complete revolution to each complete operation of the bell. This drum carries a contact 9, which, in one position of the drum, is arranged to bridge the contact fingers H³. One finger H³ is connected to one side of the supply circuit through the magnet coil C³ of the switch ES³, and the other one is connected to the opposite side of the line in a circuit through the coil F³ of the main bell motor pilot switch PS³, contacts G⁴ of the switch F⁴, and the contacts D⁴ of the switch ES⁴. A branch of this circuit is also made through a switch S⁵ actuated by the movable member or core of the pilot switch PS³.

Y is a second contact drum, which is geared to, or otherwise actuated by, the main bell operating mechanism to make one revolution to each three complete operations of the bell. This drum carries two contacts 10 and 11 spaced 120 and 240 degrees apart, and arranged to bridge contact fingers I³, one of which is connected directly to one side of the supply circuit, and the other of which is connected to the other side of the circuit through the coil B⁴ of the switch ES⁴.

Z is a contact carrying drum, actuated by the distributer, and making one revolution to each complete movement of the distributer. This drum carries two contacts 12 and 13 spaced 180 degrees between centers, which are arranged to bridge contact fingers H⁴, one of which is connected to one side of the line through the solenoid coil C⁴ of the switch ES⁴, and the other of which is connected to the other side of the line through the solenoid coil F⁴ of the pilot switch PS⁴ of the distributer motor.

Since the energization of the coil B′, in order to actuate the movable contacts 15 and 16 is necessary, in closing of the circuit of the hopper controller A′, the hopper cannot be rotated until after the skip has dumped its load and is on its down movement. On the other hand, since the solenoid coil O of the pilot switch PS of the skip-up-circuit is in series with the contacts DA′ and DA² of the switches ES′ and ES², the skip cannot be run up again until the hopper and the small bell have completed their operations.

The drum T, by controlling the energization of the coil C′ of the switch ES′ by its contacts 1ᵃ, 1ᵇ and 1ᶜ, controls the opening of the circuit of the controller A′ of the hopper motor; and also through the fingers I′ and contacts 2ᵃ, 2ᵇ, 2ᶜ, in conjunction with the contact 5 and fingers K² of the drum V, controls the closing of the circuit of the magnet coil B² of the switch ES². The upper bell cannot, therefore, be operated until after the hopper has completed its revolution, except at each fourth operation of the bell, when it is not desired to rotate the hopper. At this time the circuit of the coil B² is closed through the contact 5 of the drum V, independently of the drum T.

The drum U controls the opening of the circuit of the upper bell controller A², when the bell has completed its operation.

The drum W, through the switch SR controls the operation of the main bell motor, so that the latter cannot be operated until after the skip has discharged a predetermined number of loads—in the particular arrangement described, seven. While the switch W will close the circuit of the coil B′ of the hopper controller ES′ at each operation of the skip, and will also close the circuit of the coil B² of the small bell controller ES² through the drum V, at the proper times, it will close the circuit of the coil B³ of the large bell controller ES³ at each seventh operation only of the skip at which time the fingers M² are bridged by the contact W⁸. Therefore, the large bell cannot be operated except at this time.

The drum X closes the circuit of the solenoid coil C³ of the switch ES³ to open the main bell controller circuit after each operation of the main bell.

The drum Y controls the closing of the distributer motor controlling circuit, so that the distributer cannot be operated until the main bell has completed its operation.

The drum Z closes and opens the circuit of the coil C⁴ of the switch ES⁴ and opens the circuit of F after each movement of the distributer.

In the circuit of the coil F² of the upper bell motor pilot switch is placed the make-and-break switch G′, operated by the plunger of the solenoids of the pilot switch PS′ of the hopper motor, so that the upper bell motor circuit cannot be closed unless the circuit of this motor is first opened. In the circuit of the coil F³ of the pilot switch PS³ of the main bell motor, is a similar switch G⁴, operated by the plunger of the pilot switch PS⁴, so that the main bell operating circuit cannot be closed until the circuit of the distributer motor has first been opened. In the circuit of the coil F′ of the hopper motor pilot switch PS′ is a similar make-and-break switch G³, operated by the plunger of the coil F³ of switch PS³, which is also in the circuit of the contacts D⁴³ and E′, so that these circuits cannot be closed until the large bell motor circuit has been opened. These three make-and-break switches, G′, G³ and G⁴ act as guards to prevent the premature operation of the parts, whose circuits they control by reason of temporary circuit conditions which might otherwise occur.

The precise manner of making the various connections above described will be best understood by reference to the diagram shown in Fig. 2, in which such connections are completely shown. In this diagram, in order to avoid confusion, instead of carrying the terminals of the various sub-circuits to the respective sides of a single supply circuit or line, I have marked the terminals of these sub-circuits with the proper plus and minus signs to indicate their proper connection to the main circuit.

The particular cycle of operations which is controlled by the specific apparatus illustrated is as follows:—The skip is raised, discharged, and lowered, and the hopper revolved 90 degrees; the upper bell is then dumped, the skip raised and lowered, the hopper revolved 180 degrees, and the upper bell dumped; the skip is again raised and lowered, the hopper revolved 270 degrees and the upper bell dumped; the skip again raised and lowered and the upper bell dumped without revolving the hopper. These operations are repeated until seven skip loads have been deposited on the main bell. The main bell is then dumped, and the distributer, which has been in its lowered position, is raised. The foregoing operations, as a whole, in the same order, are then twice repeated, and the distributer is then lowered, which completes the cycle.

The diagram, Fig. 2, shows the coil $o$ of the pilot switch PS energized, the skip-up circuit closed, except at the controller A, whose pilot lamp SS is lighted.

Referring to the cycle of operations above set forth, the operations are as follows:—The controller A is closed, the skip hoisted, discharged and lowered. The lowering of the skip moves drum W one seventh revolution, momentarily closing the circuit of, and energizing the coil $B'$. This causes the movable member of that switch to be pulled over to the left, opening the contacts $D^{a'}$ and closing the contacts $D'$ and $E'$. Opening the contacts $D^{a'}$ opens the circuit of the coil O of the pilot switch PS, which opens the skip up circuit. Closing $D'$ lights the hopper signal HS, while closing the circuit at $E'$ completes the circuit of the coil $F'$ of the hopper motor pilot switch $PS'$ except at the controller $A'$. The handle of the controller $A'$ is now moved to closed position, which energizes the coil $F'$ and closes the pilot switch $PS'$, thereby opening the switch $G'$ and starting the hopper motor. The drum T revolves with the hopper until its contact $1^a$ bridges the fingers $H'$, thereby paralleling the contacts $E'$, the resistance $R^e$ causing a drop in potential, which results in the energization of the coil $C'$. This coil then pulls the movable switch member back to its original position, opening the circuit at $E'$ and $D'$ and closing it at $D^{a'}$. At this time the contact $2^a$ bridges the fingers $I'$. Opening the circuit at $D'$ extinguishes the pilot light HS, and opening the circuit at $E'$ opens the circuit of the controller $A'$, which falls open by gravity or by the action of a spring. The closing of the circuit at $I'$ energizes the coil $B^2$ of the switch $ES^2$, thereby actuating the movable member of that switch to close the circuit at $D^2$ and $E^2$ and open it at $B^{a2}$. Closing the circuit at $D^2$ lights the pilot lamp $bS$ for the small bell controller, while closing the circuit at $E^2$ closes the circuit of the coil $F^2$ of the small bell pilot motor switch $PS^2$. This circuit is, however, still open at $G'$ and at the controller $A^2$. Opening the circuit at $D^{a2}$, opens the circuit of the coil O of the pilot switch PS. When the drum T has revolved 60 degrees, the circuit is broken at $H'$, which cuts out the coil $F'$ and thereby closes the circuit at $G'$. The small bell can now be dumped. This is done by closing the controller $A^2$, which energizes the coil $F^2$ of the pilot switch $PS^2$, thereby starting the small bell motor. The drum U revolves until its contact 3 bridges the fingers $H^2$, which energizes the coil $C^2$ and causes the opening of the switch $ES^2$ and $D^2$ and $E^2$, and closing $D^{a2}$. Opening $D^2$ extinguishes the pilot lamp $bS$, and opening the circuit at $E^2$ opens the circuit of the controller $A^2$. Closing the circuit at $D^{a2}$ energizes the coil O of the pilot switch PS, which closes the skip-up circuit, lights its pilot lamp SS, and momentarily closes circuit at RS. This, however, has no effect at this time because the circuit of the coil $B^3$ is still open at $M^2$. The continued revolution of the drum U opens the circuit at $H^2$, which cuts out the coil $F^2$ of the switch $PS^2$. The drum V has now revolved 90 degrees without changing the circuit at the contacts $I^2$ and $K^2$, and the drum W has made one-seventh of a revolution. These operations are now repeated until seven loads have been discharged by the upper bell to the main bell, the operations being the same as described, except that when the drum V has revolved 270 degrees, the contacts $I^2$ are open and the contacts $K^2$ are closed, thereby energizing the coil $B^2$ so that the little bell may be dumped at this time without first revolving the hopper.

When the skip is being lowered after dumping the seventh load into the hopper, the drum W has moved to such a position that the contacts $M^2$ are closed by the contact $W^3$, so that when the contact RS is made, by the movement of the plunger of the pilot switch PS, the coil $B^3$ of the switch $ES^3$ is energized, thereby closing $D^3$ and $E^3$, and opening $D^{a3}$ and $E^{a3}$. Closing the circuit $D^3$ lights the pilot signal BS for the main bell controller. Closing $E^3$ closes the circuit for the main bell pilot switch $PS^3$, except at the controller $A^3$. Opening $D^{a3}$ opens the circuit of the coil $F'$ of the hopper pilot switch $PS'$. Opening $E^{a3}$ opens the circuit of the hopper pilot signal HS. The main bell can now be dumped, which is done by closing the handle of the controller $A^3$. This energizes the coil $F^3$ of the pilot switch $PS^3$, starting the main bell motor and opening the circuit at $G^3$. At the same time, the short-circuiting switch $S^5$ is closed. The drum X is now revolved, which causes the contact 9 to close the circuit at $H^3$, thereby energizing the coil $C^3$ and actuating the switch $ES^3$ to open the circuit at $D^3$ and $E^3$ and close the circuit at $D^{a3}$ and $E^{a3}$. Closing the circuit at $D^{a3}$ completes the circuit of the coil $F'$ except at the points $A'$, $E'$, and $G^3$. Closing the circuit at $E^{a3}$ closes the circuit of the hopper signal HS lamp except at the point $D'$. The drum Y has now revolved 120 degrees, which closes the circuit at $I^3$, and thereafter again opens it. Closing the circuit at $I^3$, energizes the coil $B^4$, which actuates the switch $ES^4$ to close the contacts $D^4$ and $E^4$ and open the contacts $D^{a4}$. Closing the circuit at $D^4$ lights the pilot lamp DS for the distributer controller, and closing the circuit at $E^4$ closes the circuit of the coil $F^4$ of the pilot switch $PS^4$ except at the controller $A^4$. Opening contacts $D^{a4}$ produces no result as they are paralleled by the short circuiting contacts $S^5$ of the pilot switch PS³. The distributer motor may now be operated for raising the distributer. This is done by closing the handle of the controller A⁴, thereby completing the circuit of coil F⁴, which starts the distributer motor, and at the same time opens the switch G⁴. The drum Z now revolves until the contacts H⁴ are closed by the contact 12, thereby energizing the coil C⁴ to return the switch ES⁴ to its former position, thus opening the circuit of controller A⁴ and extinguishing the signal DS. When the drum Z is revolved 180 degrees, which corresponds to raising the distributer, the contacts H⁴ are opened, thereby cutting out the coil F⁴, which stops the distributer motor and closes the switch G⁴.

All of the foregoing operations are now repeated twice, and upon the completion of the second sub-cycle, the contact 11 of the drum Y closes the circuit at I³, which makes it necessary to now lower the distributer and thus complete the full cycle. This returns all the parts to their original positions except the drums T and V, which are at different angular positions, without effect, so far as the three-charge cycle is concerned.

It will be noticed that during the operation of the main bell the skip can be hoisted and lowered ready to dump the small bell, there being no interference at this time with the motor circuits of these parts. Also after dumping the main bell, the raising or lowering of the distributer can be done at any time while the main bell is being again filled, thus saving time; but in the first case the hopper cannot be revolved until the main bell is closed, and in the second case the main bell cannot be opened until the distributer has been put in proper position.

By keeping the controllers A¹, A², A³ and A⁴ closed, or short-circuited, the foregoing operations, with the exception of the movement of the skip, or as many of them as may be desired, can be made entirely automatic.

In the modification shown in Fig. 3, instead of operating the switch RS by the plunger of the pilot-switch PS, I provide a separate coil O′ in the skip-up circuit, which is energized each time that circuit is closed. With this arrangement, after seven skip loads have been deposited upon the lower bell, in order to dump said bell, the skip must be first again started up.

By changing the ratios of the gears or other connections which actuate the various contact drums, and by the substitution of drums having different arrangement of contacts, the cycle of operation may be changed as may be desired for any particular furnace.

The means of control herein described are, in general, similar to those described in my said pending application. There are, however, several distinct and important differences. The most important of these is that instead of controlling the operation of the large bell by the operation of the small bell, I control both by the operation of the skip, through the drum W which is actuated directly from the skip movement.

Various means may be employed for actuating the contact carriers by the movements of the charging parts, and various forms of circuit-closing switches may obviously be used without departing from the spirit and scope of my invention, since

What I claim is:—

1. In means for controlling the operation of blast furnace charging parts, motive devices for operating the parts at the top of the furnace, a motive device for operating the skip or hoist, and a controlling device operated by the last named motive device, and controlling the power supply of the other motive devices whereby they cannot be operated except in a predetermined cycle; substantially as described.

2. In means for controlling the operation of blast furnace charging parts, having a skip or hoist and a motive device for operating the same, a controlling switch for each of the parts to be operated, said switches having inter-related circuits, and a controller operated by the skip or hoist movement and controlling said circuits; substantially as described.

3. Means for compelling the operation of blast furnace charging parts in a certain predetermined order or sequence, consisting of motive devices for the charging parts at the top of the furnace, a motive device for the skip or hoist, controlling switches for the motive devices, said controlling switches having inter-dependent and inter-related circuits, whereby each motive device can not be operated except in a certain order, and a circuit controlling device operated by the skip or hoist movement and controlling the operation of all the other motive devices; substantially as described.

4. In means for controlling the operation of blast furnace charging parts, the combination with a small bell, and a large bell, motive devices for said bells, of a skip or hoist, a motive device therefor, and a circuit controller operated by said skip or hoist and arranged to close the circuit of the small bell motive device at each operation of the skip and to close the circuit of the large bell motive device only after a certain number of operations of the small bell; substantially as described.

5. In means for controlling the operation of blast furnace charging parts, the combination with a small bell, a large bell, and motive devices for said bells, of a skip or hoist, a motive device therefor; and a circuit controller operated by said skip or hoist and arranged to close the circuit of the small bell motive device at each operation of the skip, and to close the circuit of the large bell motive device only after a certain number of operations of the small bell, together with circuit controlling means for preventing simultaneous operation of the two bells; substantially as described.

6. In means for controlling the operation of blast furnace charging parts, a skip or hoist, a hopper, a motor for operating the hopper, a circuit for the motor, and a contact device operated by the movement of the skip or hoist, and having contacts which control the circuit of the hopper motive device; substantially as described.

7. In means for controlling the operation of blast furnace charging parts, a skip or hoist, a small bell, a motor for operating the bell, and a contact device operated by the movement of the skip or hoist, and having contacts which control the operation of the small bell motive device; substantially as described.

8. In means for controlling the operation of blast furnace charging parts, a skip or hoist, a large bell, a motive device therefor, and a contact device operated by the movement of the skip or hoist, and having contacts which control the operation of the large bell motive device; substantially as described.

9. In means for controlling the operation of blast furnace charging parts, a skip or hoist, a small bell, a motive device for the bell, a hopper, a motive device for the hopper, and a contact device operated by the movement of the skip or hoist, and having contacts which control the operation of the hopper motive device and also the small bell motive device; substantially as described.

10. In means for controlling the operation of blast furnace charging parts, a skip or hoist, a hopper, a motive device therefor, a small bell, a motive device therefor, a large bell, a motive device therefor, and a contact device operated by the movement of the skip or hoist, and having contacts which control the operation of the hopper motive device and also the small bell motive device and other contacts which control the operation of the large bell motive device; substantially as described.

11. In means for controlling the operation of blast furnace charging parts, the combination with a skip or hoist, a hopper, a small bell, a large bell, a distributer, and motive devices for operating the skip or hoist, the hopper, the small bell, the large bell, and the distributer, and controlling switches for said motive devices having inter-related and inter-dependent circuits, of a circuit controlling device operated by the skip or hoist, and having contacts which directly control the operations of the hopper and the two bells; substantially as described.

12. In means for controlling the operation of blast furnace charging parts, motive devices for operating each of the parts at the top of the furnace, a controller for each motive device, a skip or hoist, and a controller operated by the skip or hoist movement and having connections which control the operation of the other controllers; substantially as described.

In testimony whereof, I have hereunto set my hand.

BARTON R. SHOVER.

Witnesses:
 BRADEN T. GILLESPIE,
 WM. H. GRAY.